Sept. 11, 1956      J. L. AASLAND      2,762,494

EAR CONVEYOR CHAIN FOR CORN HARVESTERS

Filed Dec. 10, 1953

INVENTOR.
John L. Aasland

United States Patent Office 2,762,494
Patented Sept. 11, 1956

2,762,494

EAR CONVEYOR CHAIN FOR CORN HARVESTERS

John L. Aasland, Moline, Ill., assignor to International Harvester Company, a corporation of New Jersey Application December 10, 1953, Serial No. 397,315

2 Claims. (Cl. 198—171)

This invention relates to a new and improved ear conveyor chain for corn harvesters.

Corn harvesters and more particularly sweet corn harvesters are concerned with the gathering and removing of an ear of corn from the growing stalk in such a manner that the ear will not be damaged. The means for effecting the removal of ears other than sweet corn is primarily cooperative snapping rolls. These snapping rolls are arranged and constructed to grip the stalk therebetween and cause the stalk to be forced downwardly therethrough until the point of juncture of the ear is reached, whereupon the ear by reason of the downward pulling of the stalk is snapped from the stalk. In certain field corn machines there is supplied in addition to the snapping rolls stripper plates which are adapted to be positioned slightly above the snapping rolls and spaced apart just enough to permit passage of the stalk but not passage of the ears growing on the stalk. Obviously then sweet corn harvesters employ stripping plates in conjunction with aggressive snapping rolls to insure the most uniform and non-injurious corn harvesting. As a general rule sweet corn that is mechanically picked is used for canning purposes and it is quite essential that the kernels of corn be whole and not dented or bruised in any manner in order that the corn receive top grading. The present invention thus concerns itself with means for the gentle handling of the ears subsequent to the snapping of the ears from their stalks.

It is, therefore, a principal object of this invention to provide conveyor means over ear stripping plates having means associated therewith for effecting movement of the snapped ears of corn which are partly wedged between the stripper plates in a manner to protect the ear from bruises commensurate with the protection afforded the ears by the employment of stripping plates.

Another important object of this invention is the provision of cradle-like lug means for ear conveying chains.

Still another important object of this invention is to supply lug means for ear corn conveying arranged to snugly engage the lower portion of an ear of corn.

Other and further important objects and advantages will become apparent from the disclosures in the following specification and accompanying drawing.

Figure 1:
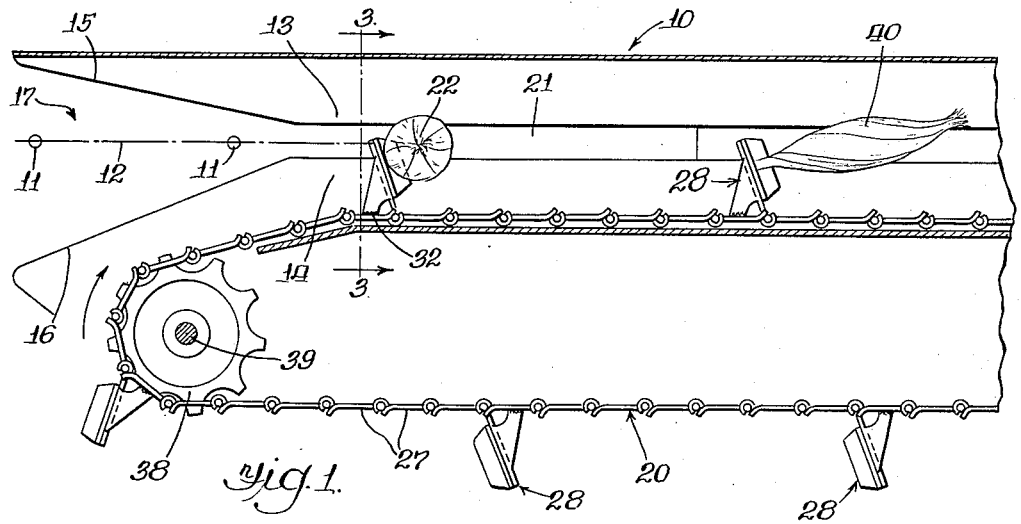
Figure 1 is a top plan view of a corn gathering and conveying mechanism employing the principles of this invention.

As shown in the drawing the reference numeral 10 indicates generally a supporting structure for a corn harvesting machine. The principle of corn harvesters is generally to cause the machine to traverse a field of standing corn in such a manner that the stalks are guided into a picking unit which constitutes the forwardly disposed portion of the corn harvester. For purposes of illustration only, the stalks are shown at 11 in a line 12 which is disposed between laterally spaced apart portions 13 and 14 of the frame structure 10. These particular portions 13 and 14 function as ear stripping plates, the operation of which will be later desribed. The forward ends of the elements 13 and 14 diverge forwardly and outwardly as shown at 15 and 16 forming a V-shaped mouth 17 for easy guiding reception of the corn stalks 11.

The picking unit of the corn harvester includes the spaced apart ear stripping plates 13 and 14, stalk pulling or snapping rolls 18 and 19 and conveyor means 20 for elevating snapped ears of corn upwardly and rearwardly into other treating portions of the corn harvester. The rolls 18 and 19 cooperate with one another to pull a corn stalk downwardly therebetween. The outer conformation of the cooperative rolls 18 and 19 is substantially star-shaped with one roll operating in timed relationship with the adjacent roll so that the apices of one will telescope within the adjacent roll between spaced apart apices. The rolls are, therefore, very aggressive in pulling the stalk by reason of the positive biting action of the star shape of the cooperative rolls. Very often corn harvesting machines employ only cooperative rolls to effect a stripping or snapping of the ears of corn from their respective stalks. However, with sweet corn which is to be used for canning it is desirable and essential to a top grading of the corn to pick the corn without injury or damage to any of the kernels thereof. In view of the fact that the snapping rolls might cause damage to the ear if it were permitted to come in contact with the juncture between these very aggressive rolls, it has been found desirable to employ stripping plates directly above the snapping rolls. The cooperative rolls thus lose their significance as snapping rolls and become merely feeding rolls for pulling the stalks downwardly therethrough to the point where the ear reaches the narrow space 21 between the spaced stripping plates 13 and 14. At this point the ears designated by the numeral 22 are of such a large size that they will not pass between the plates and continued downward movement of the stalks cause a severing of the ears therefrom. Thus the ears are severed from the stalks without coming into physical contact with the cooperative feeding rolls 18 and 19.

Figure 2:
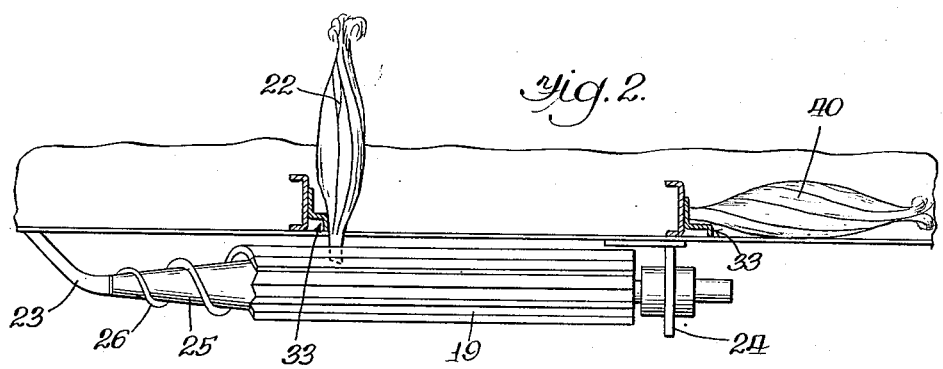
Figure 2 is a side elevational view partly in section of the device as shown in Figure 1.

As shown in Figure 2, the feeding rolls are journally carried on longitudinally spaced apart bracket members 23 and 24. The forward end of the roll 19 is tapered, as shown at 25, and has a spiral rib 26 wound therearound as an integral part thereof for the purpose of guiding the incoming stalks rearwardly into the straight flutes or longitudinal ribs comprising the star apices of the body portion of the feeding rolls 18 and 19.

Figures 3, 4, 5:
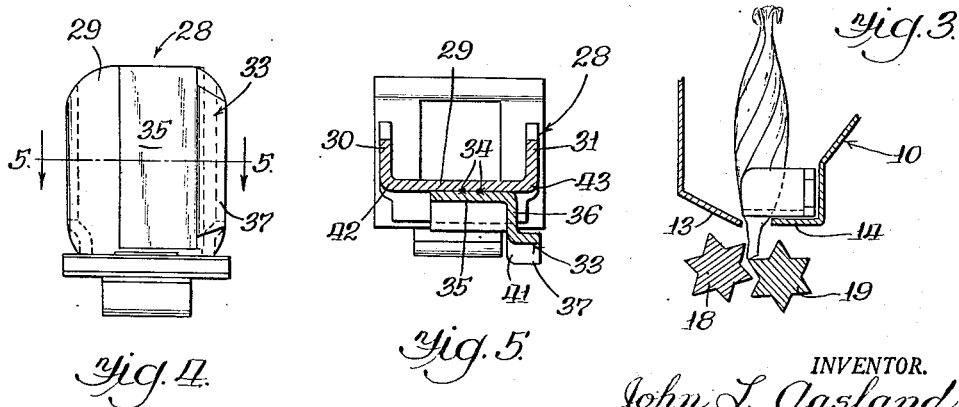
Figure 3 is a sectional view taken on the line 3—3 of Figure 1.
Figure 4 is an enlarged elevational detail view of the cradle-like lug of this invention.
Figure 5 is a sectional view taken on the line 5—5 of Figure 4.

In addition to preserving the non-damaged condition of the ears of sweet corn by reason of the employment of stripping plates 13 and 14, it is the object of the present invention to provide means associated with the ear conveyor 20 for transporting the ears throughout the corn harvester in a safe and easy manner. The endless chain conveyor 20 is composed of a plurality of chain links 27. Lugs or flight members 28 are positioned on the chain 20 at regular intervals around the length thereof. The lugs 28 include a slightly rearwardly inclined backing member 29 which has rearwardly turned side flanges 30 and 31, as best shown in Figure 5. The lower ends of the flanges 30 and 31 are welded as shown at 32 to one of the links 27, thus insuring that the backing member 29 constitutes an integral part of the chain links 27. An auxiliary rib member 33 is welded or otherwise fastened at 34 to the backing member 29. The rib 33 includes a relatively flat portion 35 adapted to lie against the backing member 29, a forwardly projecting portion 36 and thence a laterally projecting end portion 37, all as shown in Figure 5. The lugs 28 engage the ears of corn 22, as best shown in Figures 1 and 2, in such a manner that the backing plate 29 generally abuts the side of the ear 22 which is disposed substantially vertically at the time of severing from the stalk. The rib 33 which is positioned closely adjacent the chain links 27 is adapted to assist in maintaining the ear of corn in its vertical position when it is pulled loose from the stalk. This auxiliary rib 33 projects forwardly at the lower end of the ear so that it engages the ear at or near the bottom where the husk portion provides a substantial cushion for the enclosed ear of corn. The ear is thus cradled or nestled within the conveying lug 28 in such a manner that there is a minimum of bruises or damaging of the ears by movement by the conveyor. The device thus eliminates bruising of sweet corn ears at their largest and softest section. The rib 33 is added to the chain flight or backing member 29 to cause a transporting of the ears snapped by the joint action of the stripper plates 13 and 14 and snapping or feeding cooperative rolls 18 and 19. The dents, if any, made by this added auxiliary rib 33 and/or by contact with the stripper plates would be located on portions of the ear that would be cut away in the canning process and, hence, are not so objectionable as bruises further up on the body of the ears.

The endless chain 20 is shown carried on a sprocket 38 mounted on a shaft 39 which is journaled in the supporting structure 10 adjacent the V-shaped opening 17 for receiving stalks of corn. The lugs 28 of the endless chain 20 are adapted to ride on the stripper plate 14 and bridge the space 21 between the stripping plates 13 and 14. Following removal of the ears from their stalks the ears tend to lay down in the manner shown at 40, whereupon the lugs engage the snapped lower ends of the ears and move them upwardly and rearwardly. The device of the present invention is thus employed to handle the ears of corn gently without causing bruising or damage thereto. The rounded end portion 41 between the flanges 36 and 33 contributes to this cushioning handling of the ears along with the rounded side edges 42 and 43 of the backing plate 29.

I am aware that numerous details of construction may be varied throughout a wide range without departing from the cushioned conveying principles of this invention and I, therefore, do not propose limiting the patent granted hereon otherwise than as necessitated by the appended claims.

What is claimed is:

1. An ear corn conveyor comprising a supporting structure, a chain journally mounted on said supporting structure, lugs on said chain, said chain having an operating flight thereof extending upwardly and rearwardly on said supporting structure, said lugs including a backing member, means attaching said backing member to said chain in such a manner they are slightly forwardly inclined on the operating flights thereof, said backing member projecting outwardly from said chain, and a rib member fastened to said backing member and projecting rearwardly therefrom at a location adjacent the chain whereby the backing member is adapted to abut the side of an ear of corn and the rib is adapted to abut the ear at the base portion, said backing member having forwardly turned side flanges, said means attaching said backing member to said frame comprising a welding of the forwardly turned side flanges to said chain, said rib member provided with a flat surface adapted to lie against said backing member, a rearwardly bent flange, and a downwardly bent flange.

2. A device as set forth in claim 1 in which weld means is employed to fasten the flat surface of the rib to the backing member.

References Cited in the file of this patent

UNITED STATES PATENTS

| | | |
|---|---|---|
| 544,434 | Griffith | Aug. 13, 1895 |
| 545,168 | Mitchell | Aug. 27, 1895 |
| 886,065 | Nicholson | Apr. 28, 1908 |
| 920,951 | Harrison | May 11, 1909 |
| 1,560,716 | Newdick | Nov. 10, 1925 |
| 1,759,309 | Heimgartner | May 20, 1930 |
| 2,542,646 | Fergason | Feb. 20, 1951 |
| 2,544,191 | Tomfohrde | Mar. 6, 1951 |